J. STURTEVANT & J. T. WEINZIERL.
TOOL.
APPLICATION FILED JUNE 26, 1912.
1,052,982.
Patented Feb. 11, 1913.
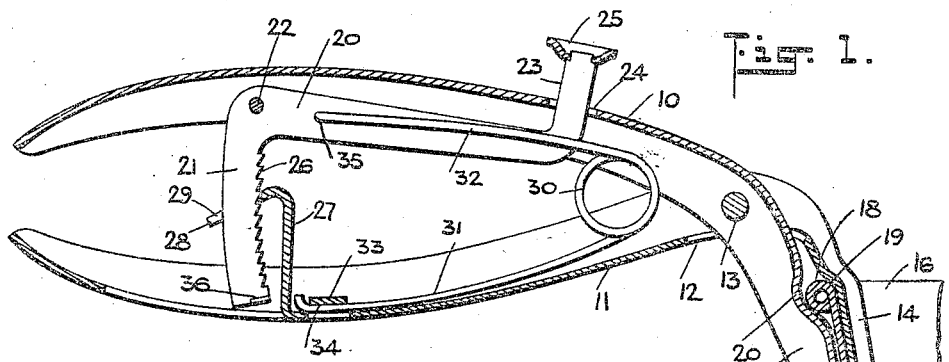
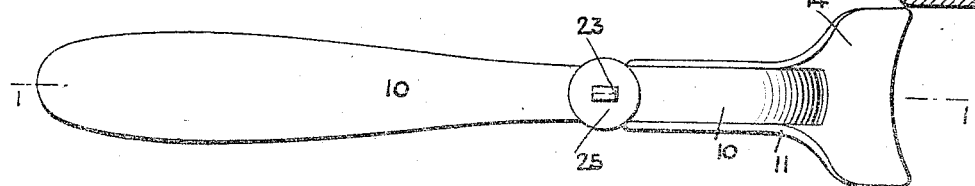
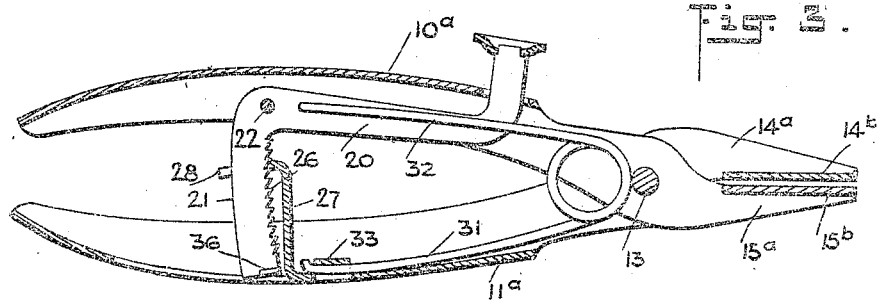
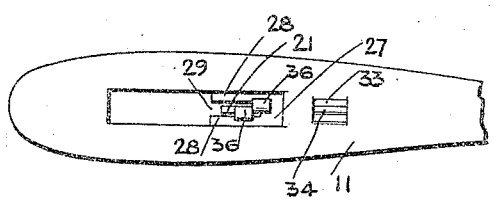
WITNESSES
INVENTORS
Julius Sturtevant
Joseph T. Weinzierl
BY
ATTORNEYS

UNITED STATES PATENT OFFICE.

JULIUS STURTEVANT AND JOSEPH T. WEINZIERL, OF NEW KENSINGTON, PENNSYLVANIA.

TOOL.

1,052,982.  Specification of Letters Patent.  Patented Feb. 11, 1913.

Application filed June 26, 1912. Serial No. 705,964.

*To all whom it may concern:*

Be it known that we, JULIUS STURTEVANT, a subject of the German Empire, and JOSEPH T. WEINZIERL, a citizen of the United States, both residents of New Kensington, in the county of Westmoreland and State of Pennsylvania, have invented a new and Improved Tool, of which the following is a full, clear, and exact description.

Our invention is more particularly intended for embodiment in detachable handles for cooking utensils, but is capable of embodiment in pliers and other gripping devices.

The distinguishing features of our invention and the important structure of elements characterizing the illustrated examples will be more particularly explained in the specific description hereinafter to be given.

Figure 1 is a longitudinal sectional elevation of a detachable handle for cooking utensils, illustrating the same in connection with a portion of a pan, the section being taken on the line 1—1 in Fig. 2; Fig. 2 is a plan view of the handle; Fig. 3 is a longitudinal sectional view showing the invention embodied in a pair of pliers; and Fig. 4 is a fragmentary plan view showing a portion of the lower handle.

In constructing a tool embodying our invention two handle members 10—11 are formed, and suitable means provided for pivotally uniting said members. In the illustrated example the members are of channel form in cross section for the main part, the one member 11 being pierced as at 12 to provide an opening through which the companion member 10 passes, a rivet or pin 13 being provided to pivot the members together. In the form shown in Figs. 1 and 2 the members are formed with jaws 14—15 which are offset or disposed at an angle to the handle parts. The outer jaw 14, which is formed on the under member 11, is substantially at a right angle to its handle and is preferably curved transversely to approximately the curvature of cooking utensils of the most common size. As a tight fit of the jaw against the cooking utensil is not essential an approximate correspondence in the curvature between the jaw 14 and the pan 16 answers in practice. The inner jaw 15, which is formed on the member 10, is formed to have a clearance at the central portion, as indicated at 17, the said jaw contacting with the pan 16 at the side edges of the jaw 15 only. To accommodate the bead 18 with which cooking utensils are usually provided at the upper edge on the outside, the jaws 14—15 are formed with depressions 19 and 20, respectively.

We provide novel means for locking the handle members when the jaws are in the closed position gripping the pan or other article, said means comprising co-acting members carried respectively by the handle parts of the members, one of the co-acting locking elements being movable, preferably by pivoting, so that it may be moved into and out of engagement with its companion locking element. Preferably the movable locking element consists of a ratchet bar, the body 20 of which is arranged lengthwise of the member 10, and the ratchet part 21 of which is at approximately right angles to the body 20, said bar being pivoted at the angle thereof, as at 22, to the member 10. At the free end of the body 20 an outwardly extending offset portion 23 extends through an opening 24 in the member 10, the outer end of the offset 23 being provided with a finger piece 25 against which the thumb or finger of the user may be pressed to rock the ratchet bar on its pivot 22 for moving into and out of engagement the teeth 26 of the ratchet part 21 with the coacting locking element 27. The locking element 27 is preferably formed integrally with the opposite handle member 11. The fixed locking element 27 is in the form of a stop or dog, which, in the example shown, is stamped from the material of the handle member 11 and extends inwardly toward the opposite handle member. The outer free end of the locking element 27 is bent desirably at an acute angle, and is forked to provide guide fingers 28 with an intervening slot 29, in which slot the ratchet part 21 of the movable locking element has guided movement. A spring is provided between the members 10 and 11, and we have so devised and arranged the spring that it serves the double function of normally tending to throw the movable locking element into engagement with its fixed locking element 27, and at the same time the spring normally tends to separate the handle members 10 and 11 to open the jaws 14 and 15. The spring is shown as formed of wire, coiled between the ends, as at 30, from which coil extend the arms 31—32. The arm 31 is fixedly secured to the member 11, preferably by stamping up a keeper 33 from the interior of the member 11, beneath which keeper the free end 34 of the arm 31 is clamped; the opposite arm 32 is bent laterally and passed through a hole, as at 35, in the body 20 of the ratchet bar to pivotally unite said spring arm with said ratchet bar. To limit the separating movement of the members 10—11 the free end of the offset ratchet part 21 of the movable locking element is formed with oppositely bent lugs 36 which will bring up against the under side of the guide fingers 28 of the fixed locking element 27 in case the spring arms 31—32 throw the handle members 10—11 to the maximum extent. It will be seen that a slight pressure on the thumb piece 25 will serve to rock the movable locking element to disengage it, and the spring then has a tendency to separate the members 10—11 to open the jaws 14—15, while the tendency of the spring also is to automatically lock the jaws in the closed position.

In the form shown in Fig. 3 the jaws 14ª—15ª are given a form to constitute pliers. the faces 14ᵇ—15ᵇ being extended forwardly from the handle members 10ª—11ª instead of being offset as in the first described construction. In all other respects the description given applies to the pliers shown in Fig. 3.

Having thus described our invention, what we claim as new and desire to secure by Letters Patent is:—

1. A tool comprising handled-members formed with gripping jaws, means to pivotally unite said jaws, co-acting locking elements carried respectively by said members, one of which locking members is movable into and out of engagement with the other, and a spring normally acting to engage the locking elements with each other and to open the handled-members.

2. A tool comprising handled-members formed with gripping jaws, means to pivotally unite said jaws, locking means consisting of co-acting elements carried respectively by said members, one of said locking elements being movable to engage the other, and a spring tending normally to exert an opening pressure on said handled-members, the pressure of the spring on one of the handled-members being exerted on said member indirectly through the movable element of the locking means.

3. A tool comprising handled-members, a ratchet bar pivoted to one member, a co-acting locking element carried by the other jaw and adapted to be engaged by the ratchet bar, and a spring having arms, one of which is connected with the ratchet bar and the other to the member on which the co-acting locking element is carried.

4. A tool comprising handled-members, locking means comprising a ratchet bar pivoted to one handled-member, said bar having its ratchet member offset in the direction of the other handled-member, and the opposite free end of said bar extending laterally through the handled-member on which it is pivoted, and provided with a thumb piece, the free end of the offset ratchet member having oppositely projecting lugs, a co-acting locking element on the opposite handled-member, said co-acting element having an offset forked member in which the ratchet member of the pivoted locking element moves, and a spring having arms, one of which is secured to the body of the ratchet bar adjacent to the pivot and the other of which is secured to the opposite handled-member.

In testimony whereof we have signed our names to this specification in the presence of two subscribing witnesses.

JULIUS STURTEVANT.
JOSEPH T. WEINZIERL.

Witnesses:
J. B. HAGERMAN,
PHILLIP ADAMS.